United States Patent [19]

Manson

[11] Patent Number: 5,542,042
[45] Date of Patent: Jul. 30, 1996

[54] METHOD AND APPARATUS FOR MONITORING VOLATILE MEMORY VALIDITY

[75] Inventor: Larry J. Manson, Baroda Township, Berrien County, Mich.

[73] Assignee: Whirlpool Corporation, Benton Harbor, Mich.

[21] Appl. No.: 67,887

[22] Filed: May 27, 1993

[51] Int. Cl.$^6$ .................................................. G06F 11/34
[52] U.S. Cl. ................ 395/181; 395/182.20; 395/182.12
[58] Field of Search ........................ 395/575, 181, 395/182.20, 182.21, 182.22, 182.12; 371/66, 57.1, 48, 21.1, 14.1, 7, 8.1, 10.2, 12, 67.1, 21.2, 71; 365/226, 229

[56] References Cited

U.S. PATENT DOCUMENTS

| | | | |
|---|---|---|---|
| 4,393,481 | 7/1983 | Owen et al. | 365/228 |
| 4,422,163 | 12/1983 | Oldenkamp | 365/229 |
| 4,531,214 | 7/1985 | Torres et al. | 371/66 |
| 4,631,658 | 12/1986 | Easthill | 364/184 |
| 4,642,753 | 2/1987 | Easthill | 364/184 |
| 4,646,307 | 2/1987 | Nishimura | 371/53 |
| 4,683,568 | 7/1987 | Urban | 371/12 |
| 4,819,237 | 4/1989 | Hamilton et al. | 371/66 |
| 5,099,453 | 3/1992 | Steele | 365/229 |
| 5,185,746 | 2/1993 | Tanaka et al. | 371/40.1 |

*Primary Examiner*—Robert W. Beausoliel, Jr.
*Assistant Examiner*—Phung M. Chung
*Attorney, Agent, or Firm*—Stephen D. Krefman; Mark A. Davis; Robert O. Rice

[57] ABSTRACT

A method and apparatus for monitoring validity of a volatile memory of a microcomputer in an electrical circuit supplied with electrical power. Loss of electrical power is sensed and upon sensing loss of power, counter is initialized. Data is obtained from a first critical memory location in the volatile memory and is stored in a second non-critical memory location in the volatile memory which is used for operating data storage during normal powered operation of the circuit. The circuit is then sensed for return of electrical power. Upon resumption of power, the data in the first memory location is compared with the data stored in the second memory location. If detection of a variance of data contents occurs between the first memory location and the second memory location, volatile memory is reset from a preset instruction. If no variance is detected, operation of the circuit is resumed utilizing the data stored in the first memory location.

20 Claims, 3 Drawing Sheets

METHOD AND APPARATUS FOR MONITORING VOLATILE MEMORY VALIDITY

BACKGROUND OF THE INVENTION

The present invention relates to a method and apparatus for verifying the validity of data stored in the volatile portion of the memory of a microcomputer upon restoration of power following a power failure.

Various methods and apparatus have been taught in the art for assuring validity of data stored in volatile memory portions of a microprocessor in view of the increasing number of useable programmable memory features in electrical appliances. In U.S. Pat. No. 4,819,237 it is described that various means such as large capacitors, batteries or other devices are used to provide a five second minimum "data valid time" in order to prevent corruption of volatile memory upon power interruptions of five seconds or less which is said to encompass 87% of all power interruptions. That patent describes a method of compressing all of the data in a verified portion of volatile memory into a bit pattern and then storing the compressed bit pattern in a separately reserved portion of volatile memory to be later verified. Upon resumption of power, a compressed bit pattern for the current data is generated and is then compared to the initial stored bit pattern. If the bit patterns are identical then an additional comparison is made of a fixed bit pattern from non-volatile memory with a fixed bit pattern which was originally copied from non-volatile memory to the reserved portion of volatile memory. If both comparisons show equality, then it is determined that the volatile memory has not become invalid and operation of the microcomputer will resume utilizing the data in the verified portion of the volatile memory.

This device requires a specified reserve space for storage of the compressed bit pattern of the volatile memory as well as the compressed bit pattern obtained from the non-volatile memory. All of the volatile memory outside of the reserved space is compressed and stored in the reserve space for later use.

SUMMARY OF THE INVENTION

The present invention provides a method and apparatus for monitoring volatile memory validity in a microcomputer using static random access memory cells. Instead of necessarily condensing the data in the memory cells and representing it by some condensed cell data such as a checksum, the present invention provides for saving each memory cell of a selected portion of the volatile memory separately. In a preferred embodiment, the complement of each selected cell is saved.

By selecting only memory cells deemed "significant" or "critical" and copying or complementing each of those cells to a volatile memory cell deemed "not significant" or "not critical", reliability of the validity test is enhanced. For this technique to fail, not only must the original memory cell change, but also the cell storing the complement of the original memory cell must change so that it is the complement of the changed memory cell. Since there are a large number of memory cells and their complements that are saved, the potential for the technique to fail is very very low.

The complementing of the "significant" portions of the memory cells occurs immediately following detection of a power loss so that only the most current version of the data will be saved. Upon resumption of power, the processor compares the "significant" sections of memory with the complement of those sections written elsewhere. If they are equal, then the insignificant sections are initialized and the processing continues. If they are not equal, all of the volatile memory is set as it would be upon initial-up.

A separate reserve area is not required to be held aside during normal operation, however, no more than half of the volatile memory can be deemed "significant" without requiring some compression technique to be used upon power failure.

DETAILED DESCRIPTION OF THE PREFERRED EMBODIMENTS

Figure 2:
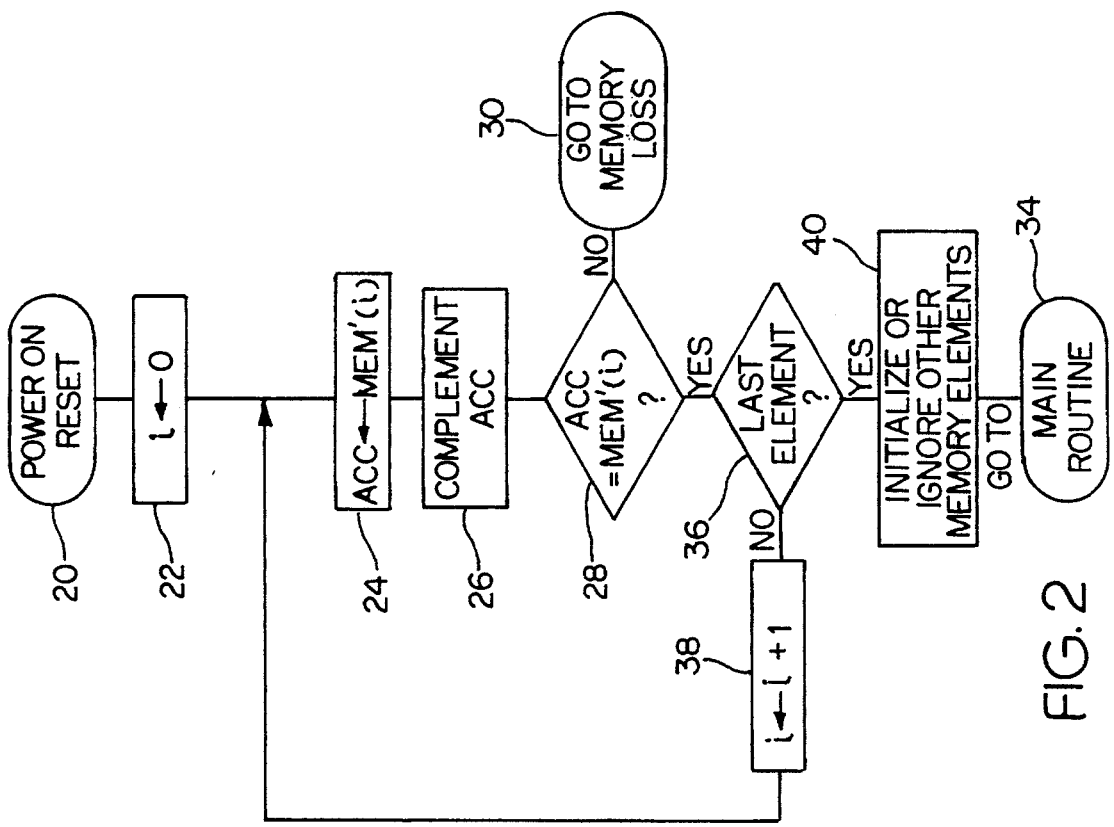
FIG. 2 is a schematic flow chart of the portion of the routine checking to see if a change has occurred in the volatile memory after power is resumed.

FIG. I schematically illustrates a portion of the overall control routine for a microprocessor utilizing static random access memory. In control unit 20 there is identified a power on reset routine which is shown in greater detail in FIG. 2. Referring to FIG. 2, control passes to control unit 22 in which a counter is initialized to zero. Control then passes to control unit 24 where a memory cell as defined by the counter is copied to an accumulator.

The memory cells (mem(i)) defined in control unit 24 may represent an address in RAM or an address in ROM pointing to an address in RAM. The first case is indexed addressing while the second case is indirect indexed addressing. The memory addresses are predetermined to have "significant" or "critical" data stored therein, such as user input data rather than data generated or calculated by operation of the appliance. This latter type of data can be re-calculated or re-determined upon resumption of power, the former type of data cannot.

Control then passes to block 26 wherein, in a preferred embodiment, a complement of the data in the accumulator is generated. Control then passes to control unit 28 where a comparison is made between the just generated complement and the data previously stored in a second RAM location as a complement of certain "critical" data from the volatile memory as will be described in detail below. This comparison of data occurs word-by-word thereby reducing the amount of memory and time required for the comparison process.

Figure 1:
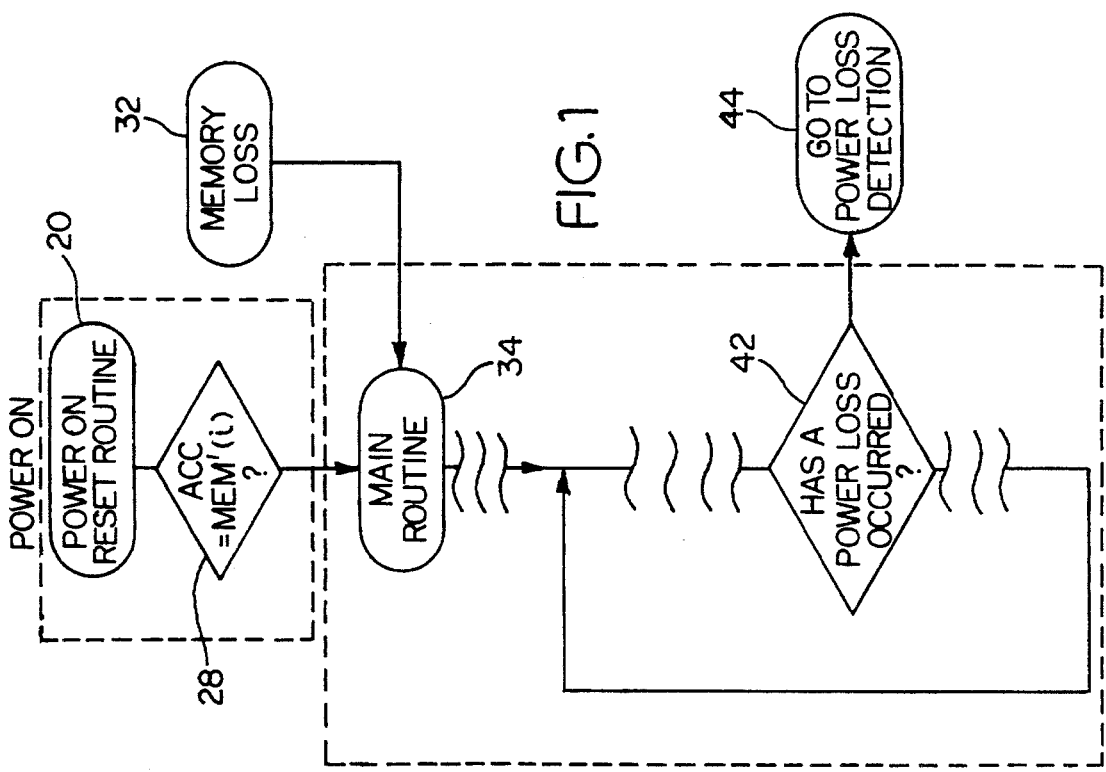
FIG. 1 is a schematic flow chart diagram showing portions of the memory checking routine.

If the comparison is unequal, then control passes to control unit 30 indicating memory loss during the power outage and all RAM will then be initialized in a memory loss routine designated as control unit 32 in FIG. 1 and control will be returned to the main program routine beginning in control unit 34. The initialization may occur based upon data or programming code stored in a non-volatile portion of memory of the microprocessor or the routine may be "hard wired in" or may be present in firmware.

A bypass mechanism may be provided upon recovery from a power loss for factory and other testing. That bypass mechanism might be a jumper, a switch, a combination of switches, a serial bit stream (possibly via IR) or some other mechanism. This bypass mechanism could be used to disable timers (such as a compressor lock out timer in an air conditioner) or allow all items to start at a present initial setting for a power on condition.

If the individual data element being checked in control unit 28 is the same as the previously stored data, then control passes to control unit 36 where it is determined whether the data just checked is the last element to be checked. If it is not, control passes to control unit 38 where the counter is increased by one and control then returns back to control unit 24 to repeat the above described process.

Once it is determined in control unit 36 that the last data element has been checked, control will be passed to control unit 40 where the portions of memory designated as "non-critical" will either be initialized from non-volatile memory (or otherwise as described) or ignored and perhaps in this step some electrical loads may be re-energized. Control then passes to control unit 34 for resumption of the main routine.

Figure 3:
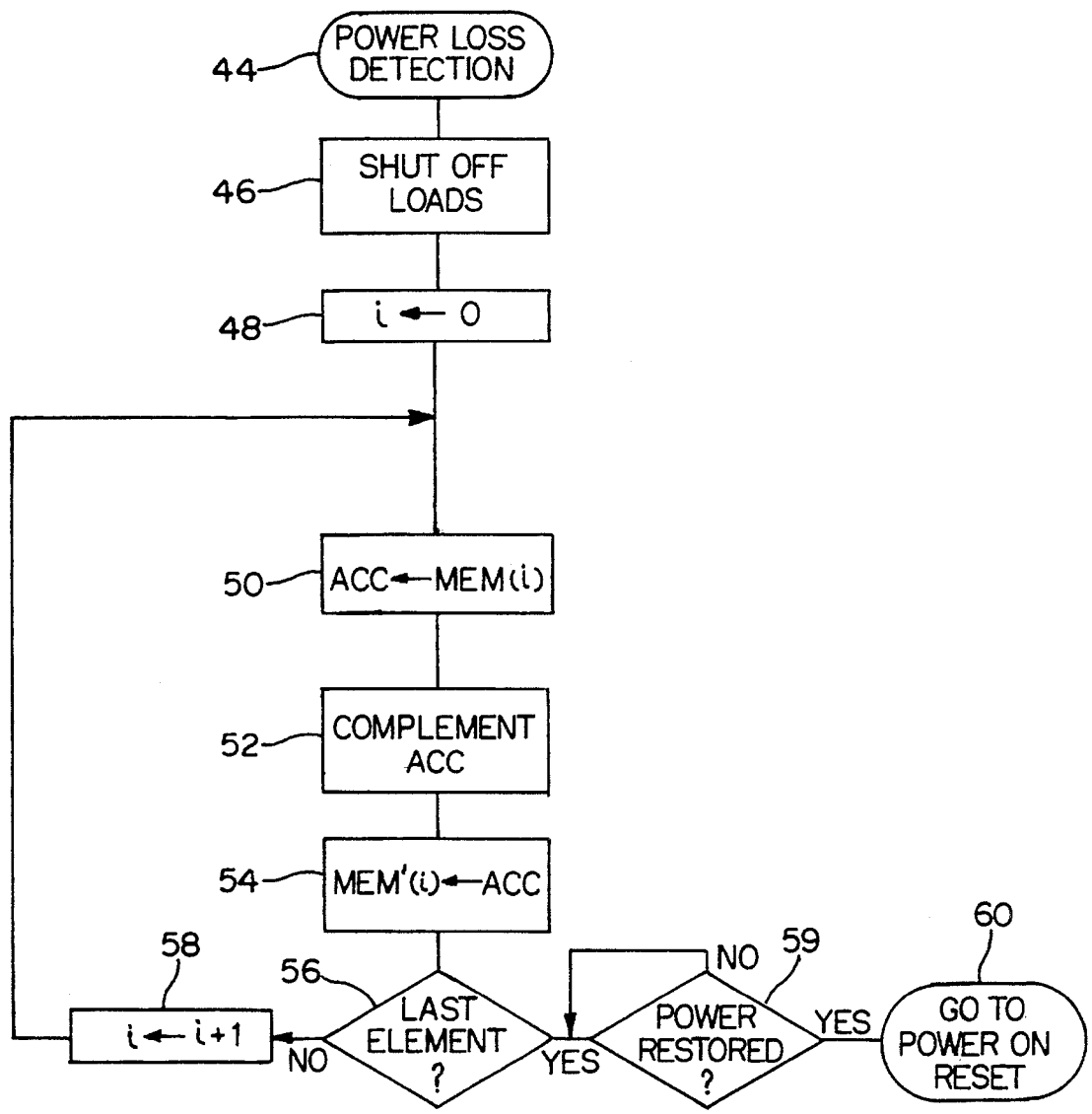
FIG. 3 is a schematic flow chart of the portion of the routine checking for power loss.

During operation of the main routine the status of the power supply is repeatedly monitored. This is done in control unit 42. If a power loss has been detected, control passes to loss detection routine 44 shown in greater detail in FIG. 3. In the power loss detection routine 44, control passes to control unit 46 which shuts off all power loads to conserve the voltage level in the circuit, including that stored in various capacitors. In the case of circuits supplied with alternating current power, loss of power can be detected by lack of a zero line crossing at predetermined time intervals. In the case of circuits supplied with direct or rectified current loss of power can be detected by a drop in voltage. Control then passes to control unit 48 where a counter is initialized to zero. Also, preferably, electrical loads may be shut off to conserve electrical charge in the circuit to give longer memory retention. Control then passes to control unit 50 wherein data from a single memory address in a portion of volatile memory which has previously been designated as "critical" is copied to an accumulator. Control then passes to control unit 52 wherein the data in the accumulator is complemented. Although it is not essential that the memory be complemented, it is believed that complementing adds an increased margin of protection against mis-operation. The complementing operation protects against conditions where all or part of the memory might revert to some natural state, either "0" or "1" due to defect or power failure. Control then passes to control unit 54 where the complemented data is copied to a memory address which previously has been identified as a "non-critical" memory address.

Non-critical memory addresses are those addresses where non-user input data is stored. During normal operation of the circuit, operational data is stored in this portion of memory which may include data from nonvolatile portions of memory, calculated results and data from various inputs and sensors such as thermostats, thermistors, clocks, etc. The data which has been input by the user is deemed "critical" in that it cannot be replicated in the event of a power loss. However, the calculated, copied and sensed data can be replicated or redetermined, and hence is deemed non-critical.

Control then passes to control unit 56 where it is inquired whether the last element of "critical" memory addresses has been complemented and stored. If not, control passes to control unit 58 where the counter is incremented by one and control then passes back to control unit 50 for repetition of the above steps.

It will be understood that when the critical data is duplicated or complemented in a non-compressed fashion, the "critical" portion of volatile memory will be physically prevented from being in excess of one half of all volatile memory. If compression techniques are used, which is not the preferred embodiment of the invention, the "critical" portion of memory could exceed one half of all volatile memory. Alternatively to complementing the data prior to storing it in a non-critical location, other reversible and semi-reversible functions could be used such as shifts, rotations, etc. Also, a compressed bit pattern complement could be used as that function is described in U.S. Pat. No. 4,819,237. Further, reversible compressed bit patterns could be used. This technique has been used for file storage, zip programs and stackers, but has not been applied to memory recovery or checking after power loss. A semi-reversible function might alternatively be used. Use of a combination of parity and/or checksums to permit recovery of one or more bytes of memory, but not the full memory, could be implemented. This technique has been used for error correcting memory, but has not been applied to memory recovery or checking after power loss. Other reversible functions such as shifts, identity, etc. could replace the described complementing function as well.

A redundancy check might be utilized to determine whether the original or the memory stored using a reversible or semi-reversible technique is correct. This will permit correction and recovery in case of partial loss. This may be accomplished, if desired, by storing a compressed bit pattern.

After it is determined in control unit 56 that the last element of "critical" memory has been complemented and stored, control passes to control unit 59 where the microcomputer waits for power to be restored. If the microcomputer has a low power capability such as a sleep mode, that capability should be utilized. Once power restoration has been detected in control unit 58, control passes to control unit 60 which returns control back to control unit 20 of FIG. 1 which begins the power on reset routine.

Figure 4:
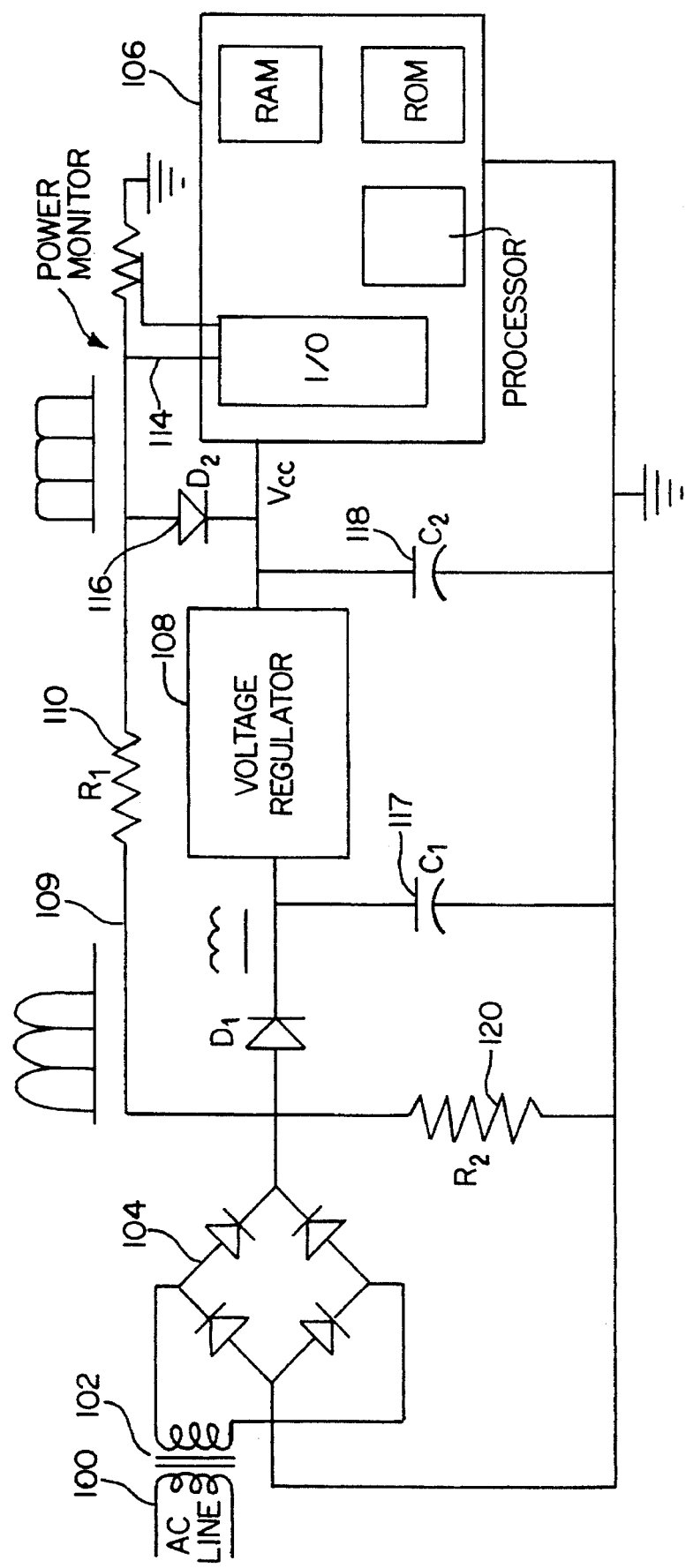
FIG. 4 is a partial electrical schematic diagram of the power loss detection circuitry.

FIG. 4 schematically illustrates the power loss detection circuitry. Power is supplied by an a/c line source at 100 and is provided to the circuit at an appropriate voltage level by means of a transformer 102. The power passes through a full wave bridge rectifier 104. An appropriate voltage level is supplied to the microprocessor or microcomputer 106 by means of a voltage regulator 108. A separate line 109, which may include an optional voltage drop resistor 110, is connected to a "power monitor" pin 114 which detects the lack of a pulse or a drop in voltage as is known in the art. A diode 116 clamps to prevent too great a voltage on the microcomputer. Electrical charge may be stored in capacitors 117, 118 for maintaining a desired voltage level for the microcomputer during periods of temporary power outages. A resistor 120 is provided for discharging any stray capacitances.

The present invention thus provides a method and apparatus for monitoring the validity of volatile memory of a microcomputer following a power loss. Although it is known to provide capacitors and circuitry to provide a five second "data valid time" tests of devices incorporating the present invention in an air conditioner control circuit have consistently maintained valid data well in excess of 60 seconds. Use of this invention avoids nuisance resetting of user input data in many instances where prior circuits have required re-entry including user caused power outages such as transfer of an appliance within a room requiring unplugging and replugging the appliance into the domestic power supply.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A method for monitoring validity of a volatile memory of a microcomputer in an electrical circuit supplied with electrical power, said method comprising the steps of:

sensing said circuit for loss of electrical power;

upon sensing loss of power, obtaining data from a first memory location in said volatile memory and storing a complement of said data in a second memory location in said volatile memory which is used for operating data storage during normal powered operation of said circuit;

sensing said circuit for loss of electrical power;

comparing a complement of said data in said first memory location with said data stored in said second memory location;

then, if detection of a variance of compared data occurs, resetting volatile memory from a preset instruction, but if no variance is detected, resuming operation of said circuit utilizing said data stored in said first memory location.

2. The method according to claim 1 which includes a circuit supplied with alternating current electrical power, wherein said step of sensing for loss of electrical power comprises detecting a missing zero line crossing.

3. The method according to claim 1 which includes a circuit supplied with direct current electrical power, wherein said step of sensing for loss of electrical power comprises detecting a drop in voltage.

4. The method according to claim 1, wherein said step of obtaining data from a first memory location and storing it to a second memory location comprises storing a non-compressed version of the complement of said data in said second memory location by means of a reversible function.

5. The method according to claim 1, wherein said step of comparing said data comprises comparing said data in a word-by-word fashion.

6. The method according to claim 1, wherein said step of resetting volatile memory occurs by means of data stored in a nonvolatile portion of memory in said microcomputer.

7. The method according to claim 1, wherein said first memory location contains data input by a user and said second memory location contains data derived by at least one of copying from nonvolatile memory, calculation from other data and sensing from inputs to said circuit.

8. A method according to claim 1 further comprising the steps of:

upon sensing loss of power, shutting off electrical loads in said circuit.

9. A method for monitoring validity of a volatile memory of a microcomputer in an electrical circuit supplied with electrical power, and said volatile memory having a plurality of memory locations, said method comprising the steps of:

sensing said circuit for loss of electrical power;

upon sensing loss of power, initializing a counter and using the count of said counter to identify first and second memory locations;

obtaining data from the first identified memory location in said volatile memory previously deemed critical and storing the complement of said data in the second identified memory location in said volatile memory which is used for operating data storage during normal powered operation of said circuit, but which was previously deemed non-critical;

incrementing said counter and repeating the previous step until the count reaches a predetermined value;

sensing said circuit for return of electrical power;

comparing the complement of said data in said critical memory locations with said data stored in said non-critical memory locations;

then, if detection of a variance of compared data occurs, resetting volatile memory from a preset instruction, but if no variance is detected, resuming operation of said circuit utilizing said data stored in said critical memory location.

10. The method according to claim 9 which includes a circuit supplied with alternating current electrical power, wherein said step of sensing for loss of electrical power comprises detecting a missing zero line crossing.

11. The method according to claim 9 in a circuit supplied with direct current electrical power, wherein said step of sensing for loss of electrical power comprises detecting a drop in voltage.

12. The method according to claim 9, wherein said step of obtaining data from a first identified memory location and storing it to a second identified memory location comprises storing a non-compressed version of the complement of said data in said second identified memory location by means of a reversible function.

13. The method according to claim 9, wherein said step of comparing said data comprises comparing said data in a word-by-word fashion.

14. The method according to claim 9, wherein said step of resetting volatile memory occurs by means of data stored in a nonvolatile portion of memory in said microcomputer.

15. A method according to claim 9, wherein said first memory location contains data input by a user and said second memory location contains data derived by at least one of copying from nonvolatile memory, calculation from other data and sensing from inputs to said circuit.

16. The method according to claim 9 further comprising the steps of:

upon sensing loss of power, shutting off electrical loads in said circuit.

17. A device for monitoring validity of a volatile memory of a microcomputer in a electrical circuit supplied with electrical power, said device comprising:

means for sensing said circuit for loss of electrical power;

means for obtaining data from a first memory location in said volatile memory and storing the complement of said data in a second memory location in said volatile memory which is used for operating data storage during normal powered operation of said circuit;

means for sensing said circuit for return of electrical power;

means for comparing the complement of said data in said first memory location with said data stored in said second memory location;

said means for comparing including means for resetting volatile memory from a preset instruction if detection of a variance of compared data occurs, but if no variance is detected, resuming operation of said circuit utilizing said data stored in said first memory location.

18. The device according to claim 17, wherein said means for obtaining data from a first memory location and storing said data to a second memory location comprises means for storing a non-compressed version of the complement of said data in said second memory location by means of a reversible function.

19. The device according to claim 17, wherein said means for comparing said data comprises means for comparing said data in a word-by-word fashion.

20. The device according to claim 17 further comprising:
   means for shutting off electrical loads in said circuit upon sensing loss of power.

* * * * *